United States Patent [19]
Smith et al.

[11] 4,357,528

[45] Nov. 2, 1982

[54] MACHINE AND METHOD FOR COUNTING AND RECONCILING PAPER MONEY

[75] Inventors: Harry B. Smith, Charlotte; Kenneth L. Robertson, Gastonia; Robert T. Smith, Mt. Holly, all of N.C.

[73] Assignee: Federal Reserve Bank of Richmond, Richmond, Va.

[21] Appl. No.: 201,000

[22] Filed: Oct. 27, 1980

[51] Int. Cl.[3] .......... G06F 7/38

[52] U.S. Cl. .......... 235/92 SB; 209/534

[58] Field of Search .......... 235/925 B, 433; 209/534; 194/1 L, 4 B, 4 R; 401/718, 718.1, 718.2

[56] References Cited

U.S. PATENT DOCUMENTS 2,429,159 10/1947 Hayes .......... 235/92 SB 2,802,626 8/1957 Hayes .......... 235/92 SB 3,392,271 7/1968 Hayes .......... 235/92 SB

*Primary Examiner*—Joseph A. Orsino, Jr.

*Attorney, Agent, or Firm*—Bell, Seltzer, Park & Gibson

[57] ABSTRACT

This machine includes a header card receiving compartment and a plurality of bill receiving compartments and is adapted to reconcile the notes rejected by a high speed counting and sorting machine. The machine includes reconciling means comprising a platen adapted to receive a batch printout sheet from the high speed counting and sorting machine, actuating means for imparting a step in movement to the platen, and operating means operable upon certain header cards being fed into the header card feeding compartment for advancing the platen and the batch printout sheet one step to position the next line of print in alignment for view by the operator.

6 Claims, 3 Drawing Figures

MACHINE AND METHOD FOR COUNTING AND RECONCILING PAPER MONEY

FIELD OF THE INVENTION

This invention relates generally to a machine and method for counting and reconciling paper money and more particularly to a machine and method for reconciling batches of paper money initially counted by an automatic counting and sorting machine producing a batch printout sheet.

BACKGROUND OF THE INVENTION

The high speed counting of paper money is usually carried out on a CVCS (currency verification, counting and sorting) machine of the type manufactured by Recognition Equipment, Incorporated of Dallas, Texas. This CVCS machine counts and sorts paper money in batches, usually 10,000 notes, binds notes which are fit for recirculation in groups of 100, shreds notes which are unfit for recirculation, and rejects notes which may be defective for a number of reasons. The paper money is fed into the CVCS machine in groups of 100 notes with a header card separating each group of 100 notes. Individual notes may be rejected for several reasons, such as a possible counterfeit, a skewed note entering the machine, a suspected double thickness note, notes fed too close or overlapped, notes which appear to be too long or too short, and notes which do not appear to be of the same denomination as the notes being run through the machine. The machine produces a batch printout sheet and a line of print is produced for each strap of notes where one or more notes are rejected by the machine or where the accepted note count was not 100.

The information on the successive lines of print of the batch printout sheet includes the header card number, the number of notes over or under 100 notes and the number of times notes were rejected, with a code letter identifying the reason for the rejection.

The counting and sorting of the paper money rejected by the CVCS machine must be verified or reconciled and this operation is normally carried out by taking the stack of header cards and rejected notes and manually counting and comparing the notes behind each header card with the printout sheet from the CVCS machine. This operation requires a considerable amount of time and is tedious in that the verifier must carefully follow each line on the printout sheet. After the verification has been made, the rejected notes must again be inspected and counted to separate the notes which are fit for recirculation and those which are unfit. Following this, the fit and the unfit notes must again be counted and strapped in groups of 100 notes. Thus, the verification or reconciliation of the header cards and the rejected notes from the CVCS machine requires several operations and is still subject to errors.

SUMMARY OF THE INVENTION

With the foregoing in mind, it is an object of the present invention to provide a machine and method for counting and reconciling batches of paper money which drastically reduces the time normally required in the verification of the notes rejected by a CVCS counting and sorting machine.

In accordance with the present invention, a conventional type of money counting machine, such as disclosed in U.S. Pat. Nos. 2,429,159; 2,802,626 and 3,392,271, is modified by providing a platen supported for step-by-step rotation on the machine and adapted to receive and maintain a batch printout sheet with a line of print in alignment for view by the operator. Actuating means, in the form of a solenoid, is provided for imparting a step in movement to the platen for advancing the next succeeding line of print on the batch printout sheet to align the same for viewing by the operator. Operating means, in the form of a switch, is operated by the header card feeding means to actuate the solenoid and advance the platen and batch printout sheet one step when a header card is deposited in the header card receiving compartment which follows a header card that had rejected notes behind it.

Using this machine for reconciling paper money, the operator merely feeds successive header cards from the CVCS machine into the header card compartment and the batch printout sheet is automatically advanced to the next line of print after the notes positioned behind a particular header card have been inspected and placed in the proper compartments of the counting machine. The counting machine is provided with retaining gates in each compartment so that the notes fed into the compartments are retained until the rejects of each batch have been verified with the printout sheet. Once all of the header cards from a particular batch are fed into the header card compartment, the operator can immediately reconcile the batch by adding the number of notes indicated on the rejected counter to the number of notes indicated as being accepted as fit and unfit on the batch printout sheet. If the total is 10,000, the reconciliation is correct and the next batch can be processed. The bill counter conventionally batches each hundred notes fed into the compartments so that the notes are accurately counted and separated into separate straps without the need of additional counting by hand.

BRIEF DESCRIPTION OF THE DRAWINGS

Other objects and advantages will appear as the description proceeds when taken in connection with the accompanying drawings, in which.

DESCRIPTION OF THE ILLUSTRATED EMBODIMENT

Figure 1:
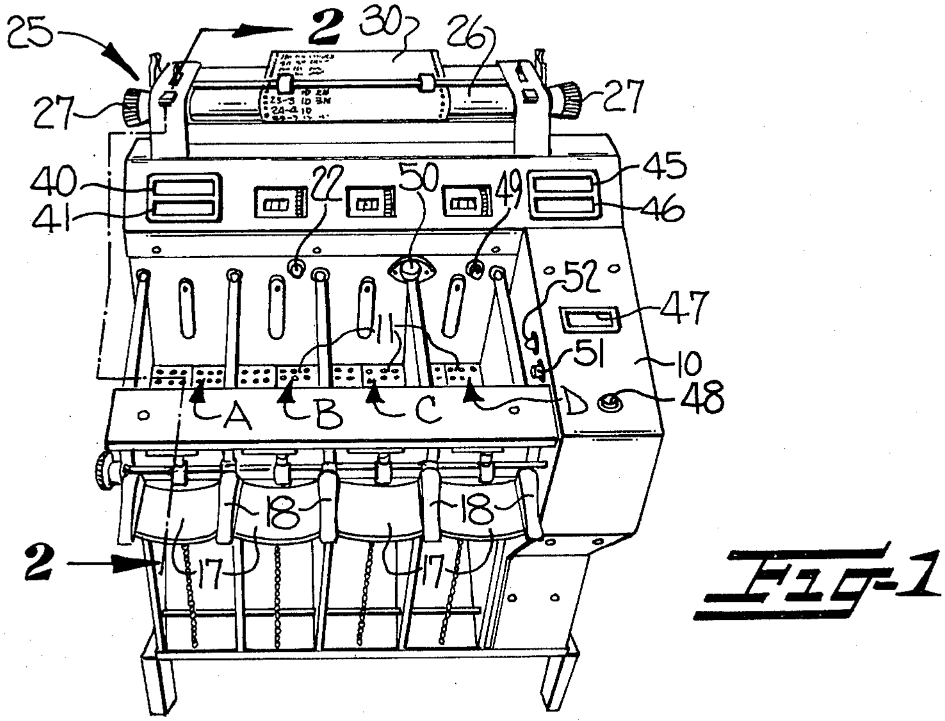
FIG. 1 is a perspective view of the counting and reconciling machine of the present invention.

The machine for counting and reconciling paper money of the present invention is provided by modifying a conventional counting machine of the general type disclosed in the U.S. Patents enumerated above. Only so much of the conventional counting machine has been shown in the drawings to understand the present invention and the patents enumerated above may be referred to for details which are not shown. The conventional machine includes a cabinet 10 which encloses some of the operative parts of the machine and the front portion of the cabinet 10 is divided into a plurality of side-by-side compartments, broadly indicated at A, B, C and D. The compartment A is provided for receiving header cards from the CVCS machine and compartments B, C and D are bill-receiving compartments. The compartment B is adapted to receive fit rejects, the compartment C is adapted to receive unfit rejects, and the compartment D is adapted to receive odd fit bills, that is, bills from each batch which are not enough bills to make a full strap (usually 100 notes).

The header cards are of substantially the same dimensions as a paper money bill, except that they are of a thicker cardboardlike material and each of the compartments is just enough larger than a bill to allow bills to settle flat therein and accumulate in stacks when fed therein. The compartments extend down to the bottom of the cabinet 10 and are each provided with a pair of hinged shelves or drop gates 11 which are normally positioned in the horizontal position and form receiving platforms upon which the header cards and bills are supported and stacked temporarily. The drop gates 11 of all of the compartments have interconnecting linkage by means of which they can be dumped to drop accumulated bills into the lower section of the corresponding compartment after each batch of paper money from the CVCS machine have been verified or reconciled.

At the forward edge of the upper end of each compartment, (FIG. 2) there is provided a lower feed roll 12 which is fixed on a drive shaft 12*a* and an upper feed roll 13 which is supported for rotation in the bifurcated lower end of a pivot support arm 14. The pivot support arm 14 is supported on the lower end of a hinge block 15 which is fixed on a support bar 16. A flexible shelf 17 is supported at opposite ends in brackets 18 and at substantially the level of the nip of the feed rolls 12, 13 to aid in guiding the header card or the bills into the feed rolls. A piece counter switch 20 and a double bill detector switch 21 are supported above the pivot support arm 14 and are operable thereby. The detector switch 21 associated with the header card compartment A is set to detect, and stop the machine if a note is fed with a header card. The other detector switches 21 are set to detect, and stop the machine, if two or more notes are fed together into the compartments B, C or D. When the machine is stopped by the double bill switches 21, a light 22 (FIG. 1) comes on to indicate to the operator what the problem is. Each time a header card or a bill is fed between the feed rolls 12, 13, the piece counter switch 20 is actuated to operate a corresponding counter, in a manner to be presently described.

In accordance with the present invention, reconcilation means is provided and includes a conventional type of typewriter platen, broadly indicated at 25, supported on the upper rear portion of cabinet 10 of the counting machine. The platen 25 includes a feed roll 26 which may be manually rotated by knobs 27 to position a batch printout sheet 30, produced by the CVCS machine, around the feed roll 26 and with a line of print in alignment for view by the operator.

Actuating means is provided for imparting rotational step-by-step movement to the platen 26 for successively advancing the lines of print on the batch printout sheet 30. The actuating means includes a ratchet 31 fixed on the feed roll 26 and a reciprocating ratchet arm 32 provided with a pawl for engaging the ratchet 31. The feed roll 26 is moved a step in rotation each time the ratchet arm 32 is moved in a counterclockwise direction, as indicated by the arrow in FIG. 2.

Operating means is provided for advancing the feed roll 26 and the batch printout sheet 30 one step each time a header card, which follows a header card that had rejected notes behind it, is fed into the compartment A. The operating means includes a flexible link 35, connected at its upper end to the ratchet arm 32. The flexible link passes over a guide pulley 36 and is connected at its lower end to the plunger of a solenoid 37. The solenoid 37 is operated by the switch 20 associated with the header card feeding rollers 12, 13 of the compartment A. The solenoid 37 is actuated each time a header card, which follows a header card that had rejected notes behind it fed into compartments B or C, is fed into the compartment A and the platen roll 26 and the printout sheet 30 are advanced so that the next line of print is positioned in alignment for view by the operator.

A switch 38 (FIG. 2) is provided to prevent operation of the solenoid 37 when a header card is fed into compartment A, unless rejected notes behind the preceding header card were fed into compartments B or C. This feature is provided because a line of print is not provided on the printout sheet unless there are notes rejected in a particular strap. Without this feature it would be necessary to manually move the platen roll 26 in a reverse direction if several header cards without rejected notes were fed into compartment A.

Figure 3:
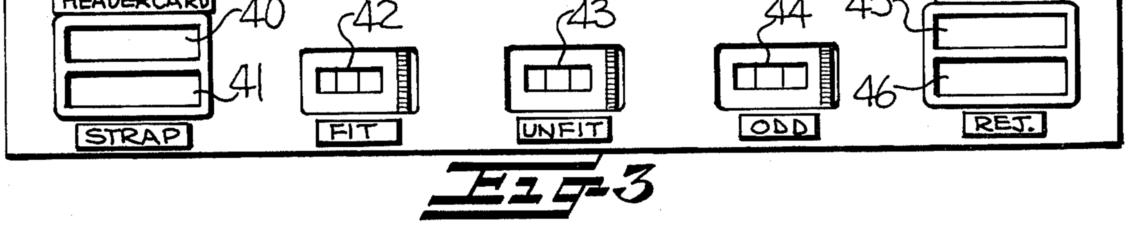
FIG. 3 is an elevational view of the counter panel, looking in the direction of the arrow 3 in FIG. 2.

A total of eight counters are provided, seven of which are supported on the panel shown in FIG. 3 and identified in the manner indicated in FIG. 3. The digital counter 40 keeps a running total of a number of header cards which are fed into the compartment A. The digital counter 41 keeps a total of the number of notes placed in the compartments B and C behind each header card. The digital counter 41 resets itself to zero when each successive header card is fed into the machine. The counter 42 records the number of fit notes fed into compartment B by the operator during the reconciliation of notes from the CVCS machine while the counter 43 records the number of unfit notes fed into the compartment C. The counter 44 records the number of odd notes placed in the compartment D. The notes placed in compartment D are those notes from a batch which are not sufficient in number to make up a total of 100 notes and are known as odd fit notes.

The counters 42, 43 and 44 continue to count the number of notes added, from one batch to the next, until any of these three counters reaches a total of 100 notes, and then that compartment will not receive another note until the leading edge of a separator card is inserted in a switch 50 (FIG. 1). The operator places a separator card in the compartment to thereby strap the particular notes in these three compartments in straps of 100 notes. This operation eliminates the need for additional counting by hand to segregate the fit, unfit and odd notes into groups of 100.

Digital counter 45 records the total number of odd fit notes for each batch placed in compartment D and digital counter 46 records the total number of rejects for each batch placed in compartments B and C. The digital counter 47 (FIG. 1) records the total number of notes handled by the operator during one entire shift of work.

In operation, the batch printout sheet 30 from the CVCS machine, along with the header cards and the rejected bills from the CVCS machine are brought to the counting and reconciling machine. The operator then inserts the batch printout sheet 30 in the feed roll 26 so that the line of print identifying the denomination of the counted notes, the date, and the time is visible and in alignment for view by the operator. When the first header card of the stack is fed into the compartment A, the sheet 30 is advanced to the line of print corresponding with the information following header card No. 1. If there are notes which have been rejected behind this first header card, the operator places the fit notes in compartment B and the unfit notes in compartment C where they are recorded. The operator visually checks the questioned notes rejected by the CVCS machine as these notes are placed in compartments B or C.

When the notes, indicated on counter 41, behind the first header card, indicated on counter 40, have been checked against the corresponding line of print on the printout sheet, the operator then places the next header card in the compartment A and the feed roll 26 is automatically advanced by operation of the solenoid 37 and the ratchet arm 32, if there were rejected notes behind the first header card. The rejected notes, if any, behind the second header card are then checked and placed in the proper compartments and checked against the line of print corresponding with the second header card. This process is followed throughout the entire batch, usually 100 header cards, until all the header cards and rejected bills, as well as the odd fit notes, for each batch are fed into the bill counter machine. The odd fit counter 45 is checked with the last two digits of the batch fit figure on the printout sheet 30. The operator then reconciles the count on the batch sheet 30 by adding the number of total rejects on digital counter 46 to the batch total (fit and unfit notes) on the printout sheet and if this total is 10,000, the count is reconciled. If the reconciliation is out of balance, the notes for the batch are still positioned above the drop gates 11 and can be removed and the batch can be rechecked. If the reconciliation is correct, a switch 48 (FIG. 1) is depressed and the drop gates 11 are opened so that the notes and header cards are dropped below into the lower portions of the compartments. Upon the completion of the verification, a switch 49 is depressed and the counters 40, 45 and 46 are reset to zero. Upon the completion of a shift, a switch 51 is pushed and counter 47 is reset to zero. A light 52 is provided to indicate when the machine is on.

Figure 2:
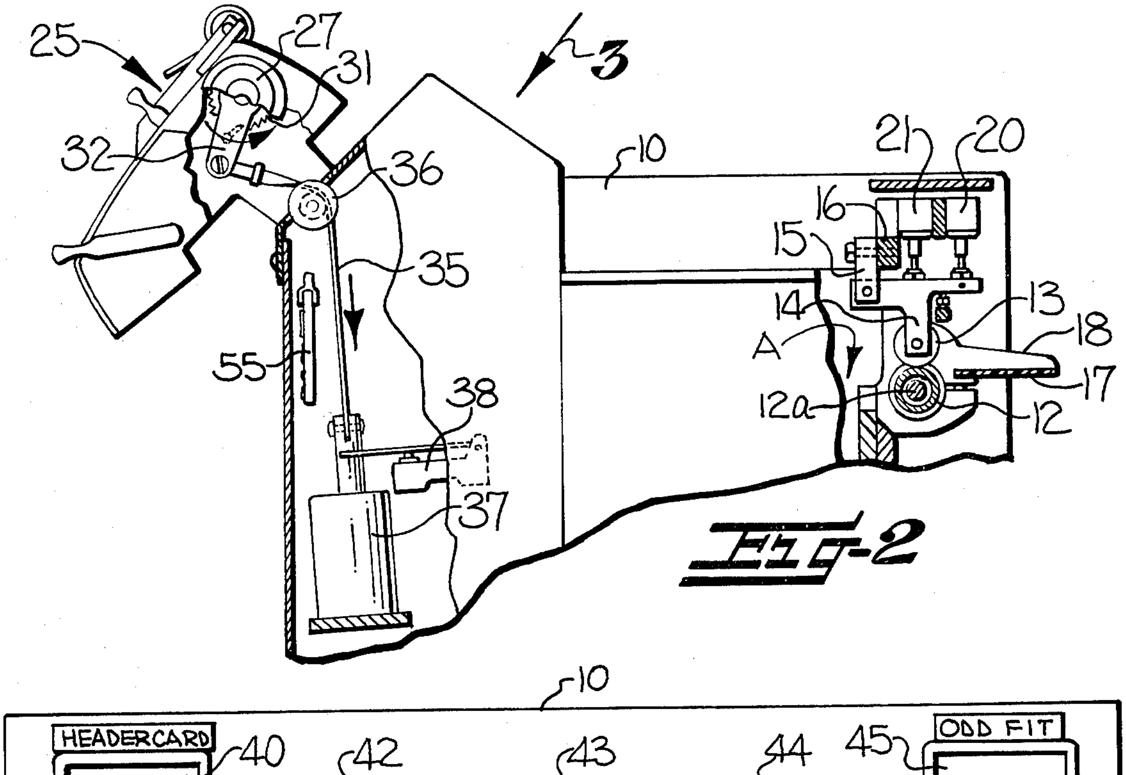
FIG. 2 is a fragmentary left-hand side view, with parts broken away, of the machine shown in FIG. 1 and being taken substantially along the line 2—2 in FIG. 1.

To integrate the conventional electrical wiring of the bill counter with the electrical wiring added for operation of the added counters and platen operating mechanism, a plug-in printed circuit board, indicated at 55 in FIG. 2, has been added. A low voltage power supply, not shown, has also been added. In order to adapt the conventional bill counter for reconciling bills from a CVCS machine, several features have been added, such as the platen 25, the mechanism for operating the platen roll 26, and the counters 40, 41, 45, 46 and 47.

Thus, the present counting and reconciling machine and method provides means for accurately and rapidly counting and reconciling paper money rejected by a CVCS machine. The present machine can be produced by adding features to a conventional type of bill counter. An operator experienced in the operation of a conventional bill counting machine can be easily trained to operate the counting and reconciling machine of the present invention in a very short period of time.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. In a machine for counting paper money including a plurality of bill receiving compartments, bill feeding means associated with each compartment, piece counter means associated with said bill feeding means of each compartment, a totalizing counter, a header card receiving compartment, header card feeding means associated with said header card receiving compartment, and header card counter means associated with said header card feeding means, the combination therewith of means for reconciling batches of paper money initially counted by an automatic counting machine producing a batch printout sheet, said reconciling means comprising a platen supported for step-by-step rotation on said machine and adapted to receive and maintain said batch printout sheet with a line of print in alignment for view by the operator, actuating means for imparting a step in movement to said platen for advancing the next succeeding line of print on said batch printout sheet to align the same for viewing by the operator, and operating means operable by said header card feeding means for advancing said platen and batch printout sheet one step when a header card is deposited in said header card receiving compartment which follows a header card that had rejected paper money behind it.

2. In a machine according to claim 1 wherein said platen comprises a feed roll, and wherein said actuating means comprises a ratchet fixed to said feed roll, a ratchet arm supported for swinging movement on said feed roll and including a ratchet pawl, and an operating link connected to said ratchet arm for actuating the same to impart the step-by-step movement to said feed roll.

3. In a machine according to claim 2 wherein said operating means comprises a solenoid connected to said operating link, and including means electrically connecting said solenoid to said header card feeding means.

4. In a machine according to claim 3 including switch means operable to at times prevent operation of said solenoid.

5. In a machine according to claim 1 including means for returning said totalizing counter to zero upon the completion of the reconciling of each batch of bills rejected by an automatic counting machine.

6. A method of counting and reconciling batches of money initially counted by an automatic counting and sorting machine into which is fed groups of paper money separated by header cards, the automatic counting and sorting machine rejecting certain paper money and the associated header card while producing a batch printout sheet including successive lines of print indicating the reason for rejecting certain paper money associated with corresponding header cards, said method comprising the step of supporting the batch printout sheet with a line of print in alignment for view by the operator of a machine for counting paper money, the counting machine including a plurality of bill receiving compartments, bill feeding means associated with each compartment, piece counter means associated with the bill feeding means of each compartment, a totalizing counter, a header card receiving compartment, header card feeding means associated with the header card receiving compartment, and header card counter means associated with the header card feeding means, said method comprising the further steps of feeding a header card into the header card receiving compartment, advancing the batch printout sheet a step in movement to position the next successive line of print in alignment for view by the operator, visually inspecting the rejected paper money associated with this header card and comparing the rejected paper money with the corresponding line of print on the batch printout sheet while feeding the rejected paper money into the bill receiving compartments, repeating these steps until all header cards of the batch have been fed into the counting machine, and then reconciling the totals on the batch printout sheet with the total on the totalizing counter.

* * * * *